US009939708B2

United States Patent
Aimone et al.

(10) Patent No.: US 9,939,708 B2
(45) Date of Patent: Apr. 10, 2018

(54) ELECTRO-OPTICAL MODULATOR AND METHOD FOR GENERATING AN ELECTRICAL OPTICAL MODULATOR

(71) Applicant: FRAUNHOFER-GESELLSCHAFT ZUR FÖRDERUNG DER ANGEWANDTEN FORSCHUNG E.V., München (DE)

(72) Inventors: Alessandro Aimone, Berlin (DE); Gerrit Fiol, Berlin (DE)

(73) Assignee: FRAUNHOFER-GESELLSCHAFT ZUR FÖRDERUNG DER ANGEW ANDTEN FORSCHUNG E.V., München (DE)

( * ) Notice: Subject to any disclaimer, the term of this patent is extended or adjusted under 35 U.S.C. 154(b) by 0 days.

(21) Appl. No.: 15/123,632

(22) PCT Filed: Mar. 4, 2015

(86) PCT No.: PCT/EP2015/054509
§ 371 (c)(1),
(2) Date: Sep. 2, 2016

(87) PCT Pub. No.: WO2015/132299
PCT Pub. Date: Sep. 11, 2015

(65) Prior Publication Data
US 2017/0075187 A1    Mar. 16, 2017

(30) Foreign Application Priority Data

Mar. 4, 2014    (DE) .......................... 10 2014 203 925

(51) Int. Cl.
*G02F 1/035*    (2006.01)
*G02F 1/225*    (2006.01)
(Continued)

(52) U.S. Cl.
CPC .......... *G02F 1/2255* (2013.01); *G02F 1/0121* (2013.01); *G02F 1/2257* (2013.01);
(Continued)

(58) Field of Classification Search
CPC .... G02F 1/0121; G02F 1/2255; G02F 1/2257; G02F 2001/212; G02F 2001/12; G02F 2001/16; G02F 2203/15
See application file for complete search history.

(56) References Cited

U.S. PATENT DOCUMENTS 4,359,600 A * 11/1982 Ponto ................... H03G 3/3026
381/107
4,521,764 A *  6/1985 Burton .................. H03G 3/001
323/283

(Continued)

FOREIGN PATENT DOCUMENTS

JP    03-209420 A    9/1991
JP    04-242716 A    8/1992

(Continued)

OTHER PUBLICATIONS

Kato, T., et al., "10 Gb/s—80-km operation of full C-band InP MZ modulator with linear-accelerator-type tiny in-line centipede electrode structure directly driven by logic IC of 90-nm CMOS process", Optical Fiber Communication Conference and Exposition, Mar. 6-10, 2011.

(Continued)

*Primary Examiner* — Rhonda Peace
(74) *Attorney, Agent, or Firm* — Maschoff Brennan

(57) ABSTRACT

An electro-optical modulator is provided. The electro-optical modulator comprises at least one optical waveguide; a plurality of segments, wherein each one of the segments comprises at least one waveguide electrode for supplying a voltage to the optical waveguide, wherein the segments are (Continued)

arranged one behind the other along the optical waveguide, and wherein each one of the segments comprises its own driver unit electrically connected to the waveguide electrode of the segment for supplying an electric signal. Each one of the segments forms an electrical resonant circuit, wherein the segments are configured in such a way that the resonance frequency of the electrical resonant circuit of at least one of the segments lies within the frequency range of an electrical signal supplied to the driver units.

13 Claims, 2 Drawing Sheets

(51) Int. Cl.
*G02F 1/01* (2006.01)
*G02F 1/21* (2006.01)
(52) U.S. Cl.
CPC .... *G02F 2001/212* (2013.01); *G02F 2201/12* (2013.01); *G02F 2201/16* (2013.01); *G02F 2203/15* (2013.01)

(56) References Cited

U.S. PATENT DOCUMENTS

| | | | |
|---|---|---|---|
| 5,189,547 A | 2/1993 | Day et al. | |
| 7,515,775 B1* | 4/2009 | Kucharski | G02F 1/025 385/1 |
| 8,488,227 B2* | 7/2013 | Uesugi | G02F 1/2255 359/237 |
| 9,020,360 B2* | 4/2015 | Stiffler | H04B 10/5165 398/115 |
| 9,140,955 B2* | 9/2015 | Hoffmann | G02F 1/025 |
| 9,838,239 B2* | 12/2017 | Chen | H04L 27/362 |
| 2002/0048421 A1 | 4/2002 | Miyazaki | |
| 2005/0211875 A1 | 9/2005 | Kawanishi et al. | |
| 2007/0139119 A1* | 6/2007 | Kojima | H03G 1/007 330/284 |
| 2012/0120472 A1 | 5/2012 | Uesugi et al. | |
| 2012/0251032 A1 | 10/2012 | Kato | |
| 2015/0110500 A1* | 4/2015 | Noguchi | G02F 1/0316 398/142 |
| 2017/0075187 A1* | 3/2017 | Aimone | G02F 1/2255 |

FOREIGN PATENT DOCUMENTS

| | | |
|---|---|---|
| JP | 2002-131712 A | 5/2002 |
| JP | 2005-236639 A | 9/2005 |
| JP | 2012-108238 A | 6/2012 |
| WO | 2013-140483 A | 9/2013 |

OTHER PUBLICATIONS

Yamase et al., "Low-Power Multi-Level Modulation of InP MZM with In-line Centipede Structure Directly Driven by CMOS IC" Proceedings OptoElectronics and Communications Conference, 2013 International Conference on Photonics in Switching, 2013.
Japanese Office Action dated Aug. 29, 2017 in application No. 2016-555609.
Akiyama, S. et al. (Sep. 8, 2004). "Low-Chirp 10-Gb/s InP-based Mach-Zehnder Modulator Driven by 1,2 V Single Electrical Signal". Proceedings of the 2004 IEICE Electronics Society Conference, p. 267.
(Sep. 2002). "40 Gbit/s traveling-wave semiconductor optical modulator with impedance controlled electrode". Proceedings of the 63th JSAP Meeting, vol. 3, p. 1020. (see accompanying statement).

* cited by examiner

ELECTRO-OPTICAL MODULATOR AND METHOD FOR GENERATING AN ELECTRICAL OPTICAL MODULATOR

CROSS-REFERENCE TO A RELATED APPLICATION

This application is a National Phase Patent Application of International Patent Application Number PCT/EP2015/054509, filed on Mar. 4, 2015, which claims priority of German Patent Application Number 10 2014 203 925.8, filed on Mar. 4, 2014.

BACKGROUND

The invention relates to an electro-optical modulator and to a method for generating such an electro-optical modulator.

Electro-optical modulators are employed especially for the generation of optical pulses in the field of high-speed data transmission. For example, electro-optic modulators in the form of Mach-Zehnder interferometers are used, these modulators comprising two optical waveguides as interferometer branches and an electrode arrangement for supplying a voltage across the optical waveguides in order to induce a phase shift of a light wave guided in the optical waveguides. For example, the electrode arrangement comprises a plurality of electrodes, wherein an individual driver unit for supplying a voltage across a segment of the optical waveguides is assigned to each one of the electrodes. Such a modulator is disclosed, for example, in the article "Low-Power Multi-level Modulation of InP MZM with In-line Centipede Structure Directly Driven by CMOS IC", T. Yamase et al., Proceedings OptoElectronics and Communications Conference held jointly with 2013 International Conference on Photonics in Switching (OECC/PS), 2013.

The electrical data signal which is supplied to the optical waveguides of the modulator via the driver units for generating an optical output signal usually is converted using a digital-analog converter (which is e.g. a component of the driver unit) and/or is processed by a digital signal processor; in particular the frequency spectrum of the data signal fed to one of the driver units is modified in order to obtain an optical output signal with a predefined frequency spectrum. The signal processing is required in particular in order to be able to allocate the optical output signal to a provided frequency channel or a plurality of frequency channels.

SUMMARY

An object of the invention is to permit the output spectrum of an electrical optical modulator to be adapted in a simpler manner.

This object is achieved by providing an electrical optical modulator with the features as described herein and by providing a method with the features as described herein.

According to the invention, an electrical optical modulator is provided, comprising
  at least one optical waveguide;
  a plurality of segments, wherein each one of the segments comprises at least one waveguide electrode for supplying a voltage to the optical waveguide, wherein the segments are arranged one behind the other along the optical waveguide,
  and wherein each one of the segments comprises its own driver unit electrically connected to the waveguide electrode of the segment for supplying an electric signal, wherein
  each one of the segments forms an electrical resonant circuit, wherein the segments are configured in such a way that the resonance frequency of the electrical resonant circuit of at least one of the segments lies within the frequency range of an electrical signal supplied to the driver units.

The driver units of the modulator in particular are arranged one behind the other along the optical waveguides, wherein, for example via a shared electrical line, an electrical data signal is fed to the driver units. Further, each one of the driver units may comprise an electrical amplifier and/or a digital-analog converter. The voltage at the waveguide electrodes of the modulators segments is highest at the respective resonance frequencies of the resonant circuits formed by the segments. Signals generated by the driver units having frequencies distanced from the resonance frequencies generate lower voltages at the waveguide electrodes such that these frequencies have a smaller effect on an optical wave propagating in the optical waveguides (and thus in particular create a smaller phase shift of the optical wave). For example, the segments of the modulator are configured in such a way that essentially only signals comprising a frequency in the region of at least one of the resonance frequencies have an effect on an optical wave propagating in the optical waveguide.

Accordingly, the frequency range or the modulation frequency an optical wave in the optical waveguide shall be modulated with (according to a desired optical output frequency range or a desired optical output frequency of the modulator) can be set by a suitable design of the modulators segments. Other frequencies are suppressed. It is thus in particular possible to form the spectrum of the optical output signal of the modulator; for example, in order to adapt the optical output spectrum to available optical data channels as set forth above. Such an adaptation of the output spectrum thus is carried out by the modulator (i.e. the light modulating part of the modulator in combination with the driver units), which e.g. simplifies a corresponding signal processing by a signal processor or even makes redundant such a signal processing, thereby e.g. reducing the fabrication costs of the modulator. Furthermore, the modulator according to the invention can be employed in a variety of applications; e.g. for realizing different modulation methods and applications.

For example, the resonance frequency of the resonant circuit of at least one of the segments lies in the range of 1 GHz and 100 GHz.

Furthermore, the resonance circuits formed by the segments, for example, are RLC resonance circuits, i.e. resonance circuits that each comprise a resistive component (R component), and inductive component (L component) and a capacitive component (C component).

For example, the resistive component of the RLC resonance circuits is formed by at least the resistance (serial resistance) of at least one electrical connecting line (for example, in the form of a bonding wire or a plurality of bonding wires) between the driver units and the waveguide electrode of the corresponding segment. Furthermore, other resistors of the modulator segment may contribute to the resistive component, in particular contact resistances; for example between the electrical connecting line and the driver unit on the one hand and/or between the electrical connecting line and the waveguide electrodes on the other hand.

The inductive component of the RLC resonance circuits for example is generated by at least the inductance of at least one connecting line between the driver unit and the waveguide electrode of the corresponding segment. Moreover, further elements of the modulators segments may contribute to the inductive component, for example, an inductance of the waveguide electrodes and/or the optical waveguide.

The capacitive component of the RLC resonance circuits, for example, is formed by at least the capacitance of a capacitive section of the optical waveguide. For example, the capacitive section of the optical waveguide in particular comprises a diode structure; for example in the form of a p-i-n diode, a n-i-n diode or a Schottky diode. In particular, the optical waveguide is formed by a semiconductor structure, i.e. the optical waveguide is arranged on a semiconductor substrate (e.g. an indium phosphide substrate) and comprises at least one light guiding semiconductor layer.

According to another embodiment of the invention, the modulator comprises a first and a second optical waveguide, wherein each one of the segments of the modulator comprises a first waveguide electrode for supplying a voltage across the first optical waveguide and a second waveguide electrode for supplying a voltage across the second optical waveguide, and wherein the driver unit of each one of the segments is connected to the first and the second waveguide electrode of that segment. Thus, a signal can be individually supplied to the waveguide electrodes of a segment. In particular, the modulator according to that embodiment of the invention is a Mach-Zehnder modulator. The basic electrical and optical design of such a modulator is described in the article "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, which is enclosed by reference herewith.

It is, however, noted, that the invention is not restricted to Mach-Zehnder modulators. Rather, the invention can be also used with other modulator types, for example, phase modulators.

The first and the second waveguide electrode of a segment of the modulator can be for example coupled to one another via capacitive segments of the first and the second waveguide. As mentioned above, the capacitive segments of the optical waveguides may be formed by a diode structure. This, however, is only optional. It is, for example, also conceivable that the first and the second waveguide electrode of a segment are separated from one another, wherein e.g. the first or the second waveguide electrodes are connected to ground.

Furthermore, it is possible that at least two of the segments of the modulator have different resonance frequencies. This in particular permits the generation of an optical output spectrum which comprises a plurality of frequencies (corresponding to the number of different resonance frequencies) and thus serves for a more precise shaping of the optical output spectrum generated by the modulator. However, it is also possible that all segments of the modulator have at least essentially the same resonance frequency.

The invention also relates to a method for generating an electro-optical modulator as described above, comprising the steps of:
  generating at least one optical waveguide;
  generating a plurality of segments, wherein each segment comprises a waveguide electrode for supplying a voltage to the optical waveguide, wherein the segments are arranged one behind the other along the optical waveguide;
  providing a plurality of driver units and electrically connecting each one of the driver units to the waveguide electrode of one of the segments, wherein each one of the segments is generated in such a way that it forms an electrical resonant circuit, wherein the resonance frequency of the electrical resonant circuit of at least one of the segments lies within the frequency range of an electrical signal supplied to the driver units.

The modulator thus may be designed for a desired optical output signal having a predetermined frequency spectrum as already set forth above. For example, the waveguide electrodes, the electrical connections between the driver units and the waveguide electrodes and/or the capacitive structures of the optical waveguides are fabricated in such a way that the resonance frequency of the resonance circuit of at least one of the segments lies within the desired optical output spectrum. It is, for example, also conceivable that instead of a spectrum, a single desired frequency of the optical output signal of the modulator is predefined, wherein the segments are generated in such a way that the resonance frequency of the resonance circuit of at least one of the segments at least essentially match the desired optical output frequency.

BRIEF DESCRIPTION OF THE DRAWINGS

Embodiments of the invention are described in more detail hereinafter with respect to the drawings.

DETAILED DESCRIPTION

Figure 1:
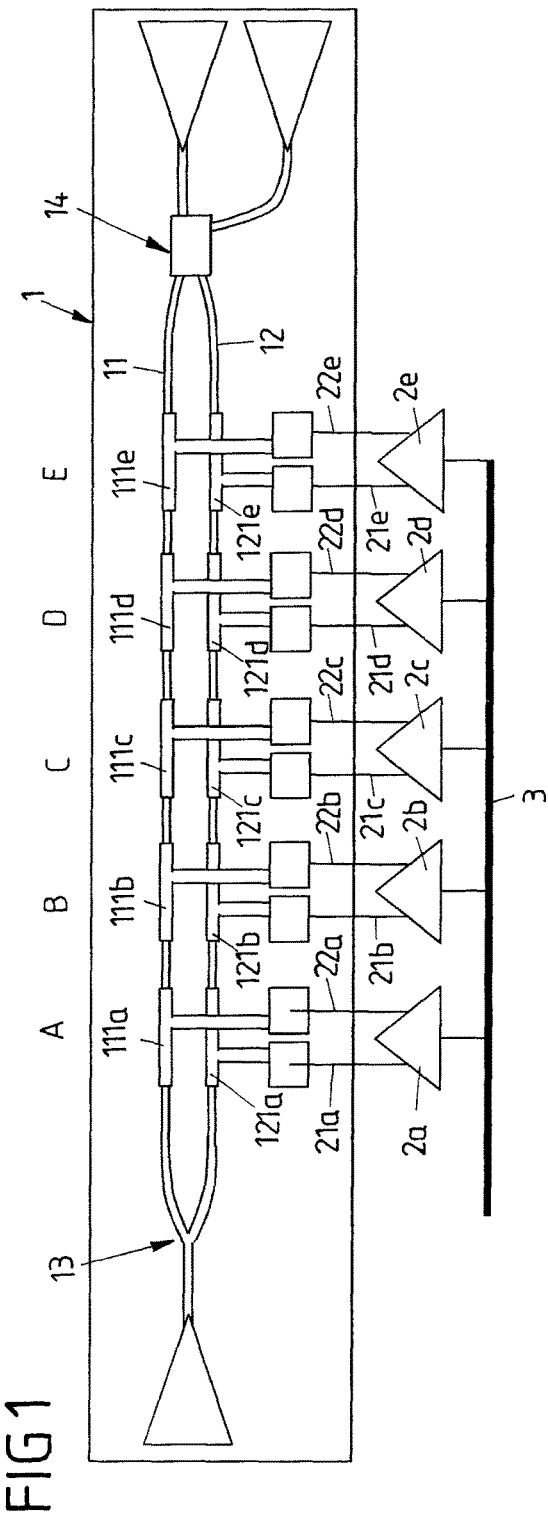
FIG. 1 shows schematically a top view of an electro-optical modulator according to an embodiment of the invention.

FIG. 1 illustrates an electro-optical modulator according to the invention in the form of a Mach-Zehnder modulator 1. The Mach Zehnder modulator 1 comprises two interferometer arms formed by a first and a second optical waveguide 11, 12, the optical waveguides 11, 12 being connected to an input port of the modulator 1 via a splitter 13 and to an output port (or a plurality of output ports) of the modulator 1 via a combiner 14 (for example, in the form of an MMI). The input port may comprise an optical taper, i.e. a tapered waveguide section, or a spot size converter.

The Mach-Zehnder modulator 1 furthermore comprises an electrode arrangement for supplying an electrical voltage to the optical waveguides 11, 12. The electrode arrangement comprises a plurality of first waveguide electrodes 111a-111e and a plurality of second waveguide electrodes 121a-121e. A section of each one of the first and the second waveguide electrodes 111a-111e, 121a-121e is arranged on the first and the second optical waveguide 11, 12, respectively, wherein the first waveguide electrodes 111a-111e are positioned in a distance from one another on the first optical waveguide 11 and also the second waveguide electrodes 121a-121e are arranged with a distance from one another (on the second optical waveguide 12). Each waveguide electrode pair consisting of one of the first waveguide electrodes 111a-111e and one of the second waveguide electrodes 121a-121e, which in a direction perpendicular to the optical waveguides 11, 12 are arranged opposite to one another, belongs to one of the segments A-E of modulator 1.

The Mach-Zehnder modulator 1 moreover comprises a plurality of driver units 2a-2e, wherein each one of them belongs to one of the segments A-E and are connected to the first and the second waveguide electrode 111a-111e, 121a-121e of the corresponding modulator segment A-E.

An electrical data signal is supplied to the driver units 2a-2e via a shared electrical line 3, wherein the driver units 2a-2e dependent on that data signal transmit a (e.g. amplified) signal (e.g. a voltage) to the assigned first and second waveguide electrode 111a-111e, 121a-121e, that signal interacting with a light wave guided in the first and the second optical waveguide 11, 12. Accordingly, a phase shift is induced into a light wave fed into the optical waveguides 11, 12, the phase shift resulting in an intensity modulation of the light wave.

The driver units 2a-2e are connected to with the first and the second waveguide electrodes 111a-111e, 121a-121e via electrical connecting lines 21a-21e, 22a-22e. For this purpose, each one of the waveguide electrodes 111a-111e, 121a-121e comprises a section arranged on the optical waveguides 11, 12 and a bar (e.g. in the form of an air bridge) which leads to an (e.g. square) contact area 112a-112e, 122a-122e. Each one of the electrical connecting lines 21a-21e, 22a-22e is connected to one of the contact area 112a-112e, 122a-122e (for example, via a bond connection).

The segments A-E of the modulator 1 are configured in such a way that each of them realizes a resonance circuit comprising a resistive component, an inductive component and a capacitive component, i.e. each one of the resonant circuits is formed as an RLC resonance circuit. The behavior of each one of the resonant circuits is governed by these components, in particular these components determine the resonance frequency of the resonance circuits.

The resistive component of each one of the resonance circuits in particular depends on the electrical resistance of the connecting lines 21a-21e, 22a-22e, the resistance of the waveguide electrodes 111a-111e, 121a-121e and depends on contact resistances, in particular between the electrical connecting lines 21a-21e, 22a-22e and the contact areas 112a-112e, 122a-122e and between the sections of the waveguide electrodes 111a-111e, 121a-121e arranged on the optical waveguides 11, 12 and the optical waveguides 11, 12.

Further, each one of the electrical connecting lines 21a-21e, 22a-22e and the waveguide electrodes 111a-111e, 121a-121e comprises an inductance, which contributes to the inductive component of the corresponding resonance circuit. Furthermore, each one of the optical waveguides 11, 12 forms a capacitive structure in the form of a p-i-n diode, which is arranged below the waveguide electrodes 111a-111e, 121a-121e and considerably contributes to the capacitive component of the corresponding resonance circuit; see the equivalent circuit diagram of a resonance circuit of one of the modulators segments shown in FIG. 3.

Figure 2:
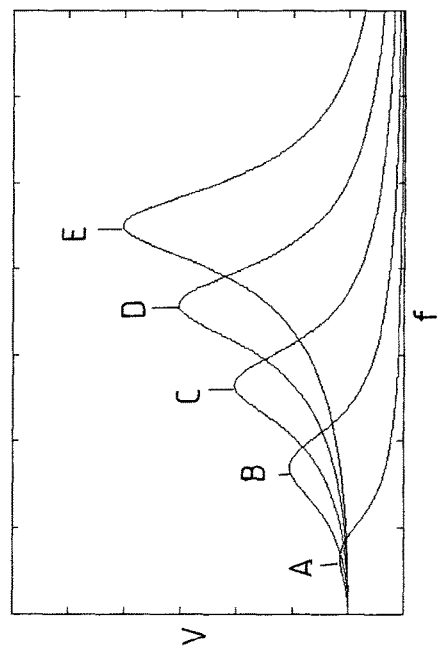
FIG. 2 shows the resonance behavior of the segments of the modulator illustrated in FIG. 1.

The design of the elements of the modulators segments A-E discussed above thus determines the resonance frequency of the resonance circuits formed by the modulators segments. It is conceivable that the segments A-E of the modulator 1 are configured in such a way that they have different resonance frequencies $f_R^A$-$f_R^E$ as depicted in FIG. 2 with respect to the segments A-E of the modulator shown in FIG. 1. FIG. 2 shows the voltages in the segments A-E at different frequencies of the voltage generated by the driver units 2a-2e.

The above-mentioned electrical components of the segments A-E, in particular are dimensioned in such a way that the optical output spectrum of the modulator at least essentially corresponds to a predetermined spectrum. For example, those electrical components of segments A-E that determine their resonance frequency are designed in such a way that each one of the resonance frequencies $f_R^A$-$f_R^E$ of the segments A-E at least essentially correspond to one desired optical output frequency of the modulator. Dependent on the quality (i.e. the Q factor) of the corresponding resonance circuit (i.e. the width of the corresponding resonance maximum) an at least essentially discrete output spectrum or a continuous output spectrum extending over a frequency range can be generated. The number of frequencies (or the width) of the output spectrum is adapted in particular by modifying the number of modulators segments. For example, the optical spectrum of the output signal of the modulator 1 shown in FIG. 1 comprises essentially five frequencies in the region of the resonance frequencies $f_R^A$-$f_R^E$ of the resonant circuits of the modulator segments A-E. It is, of course, also conceivable that modulator 1 comprises more or less than five segments with different resonance frequencies.

Figure 3:
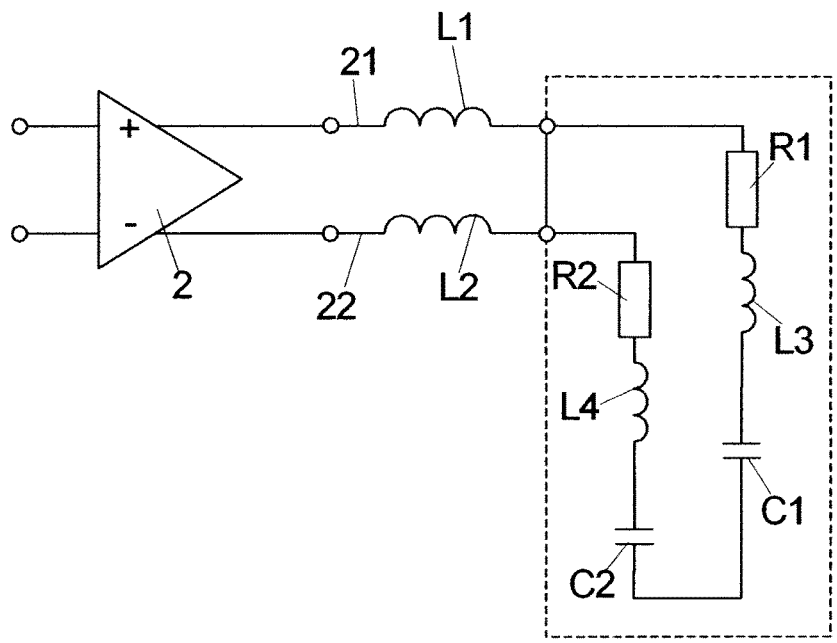
FIG. 3 shows an equivalent circuit diagram of a segment of a modulator according to the invention.

The basic electrical design of a segments (for example, of one of the segments A-E of modulator 1 shown in FIG. 1) of the modulator according to the invention is illustrated in FIG. 3 by means of an equivalent circuit. As already set forth above in connection with FIG. 1, a segment of the modulator comprises a driver unit 2 that is connected to waveguide electrodes of the segment via connecting lines 21, 22. The connecting lines 21, 22 and the waveguide electrodes comprise a serial resistance, wherein the serial resistances in combination with existing contact resistances form the resistive components $R_1$, $R_2$ of the resonance circuit. The connecting lines and also the waveguide electrodes further comprise an inductance denominated in FIG. 3 as inductances $L_1$, $L_2$. Furthermore, the optical waveguides of the modulator may comprise a capacitive structure (in particular in the form of the PIN diodes mentioned above) which comprise capacitances C1 and C2, respectively. Furthermore, the optical waveguides or any other electrically acting structure of the modulator in the region of the optical waveguides may generate additional inductances $L_3$, $L_4$.

It is also noted that the modulator segments of course may comprise components which do not form part of the respective resonance circuit. For example, the driver units of the segments may comprise components which are not components of the corresponding resonance circuit. It is for example conceivable that only the output ports of the driver units also form a component of the resonance circuit formed by the corresponding modulator segment.

Figure 4:
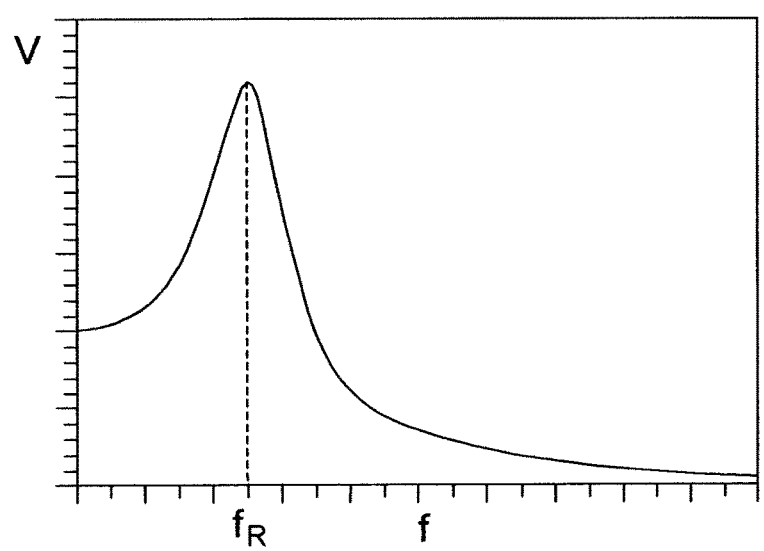
FIG. 4 shows the resonance behavior of the resonance circuit of FIG. 3.

A simulation of the resonance behavior of the resonance circuit of FIG. 3 is illustrated in FIG. 4. It can be seen that for a frequency of the voltage supplied by driver unit 2 in the region of the resonance frequency $f_R$ of a resonance circuit, a rise of the voltage V in the resonance circuit occurs. For frequencies outside the resonance frequency (in particular at higher frequencies) only a low voltage exists in the resonance circuit; i.e. a voltage supplied by the driver unit with such a frequency acts on the optical waveguides with low intensity, only, and thus has only a small or no contribution to the modulation of the optical waves propagating in the optical waveguides.

REFERENCE SIGNS

1 Mach-Zehnder modulator
2, 2a-2e Driver units
21, 21a-21e Connecting line
22, 22a-22e Connecting line
111a-111e First waveguide electrode
121a-121e Second waveguide electrode
112a-112e Contact area 122a-122e Contact area
A-E Segment
$R_1$, $R_2$ Resistance
$L_1$, $L_2$, $L_3$, $L_4$ Inductance
$C_1$, $C_2$ Capacitance
$f_R$, $f_R^A$-$f_R^E$ Resonance frequency

The invention claimed is:
1. An electro-optical modulator, comprising
at least one optical waveguide;
a plurality of segments, wherein each one of the segments comprises at least one waveguide electrode for supplying a voltage to the optical waveguide, wherein the segments are arranged one behind the other along the optical waveguide,
and wherein each one of the segments comprises its own driver unit electrically connected to the waveguide electrode of the segment for supplying an electric signal, wherein the driver unit transmits an amplified signal to the waveguide electrode,
wherein each one of the segments forms an electrical resonant circuit, wherein the segments are configured in such a way that the resonance frequency of the electrical resonant circuit of at least one of the segments lies within the frequency range of an electrical signal supplied to the driver units.

2. The electro-optical modulator as claimed in claim 1, wherein the resonance frequency of the electrical resonant circuit of at least one of the segments lies in the range between 1 GHz and 100 GHz.

3. The electro-optical modulator as claimed in claim 1, wherein each of the electrical resonant circuits formed by the segments are formed as RLC resonant circuit.

4. The electro-optical modulator as claimed in claim 3, wherein a resistive component of each one of the RLC resonant circuits is formed by at least the electrical resistance of at least one electrical connection between the driver unit and the waveguide electrode of the segments.

5. The electro-optical modulator as claimed in claim 3, wherein an inductive component of each one of the RLC resonant circuits is formed by at least the inductance of at least one electrical connection between the driver unit and the waveguide electrode of the segments.

6. The electro-optical modulator as claimed in claim 3, wherein a capacitive component of the RLC resonant circuit is formed by at least the capacity of a capacitive section of the optical waveguide.

7. The electro-optical modulator as claimed in claim 6, wherein each one of the capacitive sections comprises a diode structure.

8. The electro-optical modulator as claimed in claim 1, comprising a first and a second optical waveguide, wherein each one of the segments comprises a first waveguide electrode for supplying a voltage across the first optical waveguide and a second waveguide electrode for supplying a voltage across the second optical waveguide, and wherein the driver unit of each one of the segments is connected to the first and second waveguide electrode of the segment.

9. The electro-optical modulator as claimed in claim 8, wherein the first and second waveguide electrode of a segment are coupled to one another via capacitive segments of the first and the second optical waveguide.

10. The electro-optical modulator as claimed in claim 1, wherein at least two of the segments have different resonance frequencies.

11. A method for fabricating an electro-optical modulator as claimed in claim 1, comprising the steps of:
generating at least one optical waveguide;
generating a plurality of segments, wherein each segment comprises a waveguide electrode for supplying a voltage to the optical waveguide, wherein the segments are arranged one behind the other along the optical waveguide;
providing a plurality of driver units and electrically connecting each one of the driver units to the waveguide electrode of one of the segments, wherein each of the driver units transmits an amplified signal to the waveguide electrode,
wherein each one of the segments is generated in such a way that it forms an electrical resonant circuit, wherein the resonance frequency of the electrical resonant circuit of at least one of the segments lies within the frequency range of an electrical signal supplied to the driver units.

12. The method as claimed in claim 11, further comprising defining a desired optical output spectrum of the electro-optical modulator and generating the segments in such a way that the resonance frequency of the electrical resonant circuit of at least one of the segments lies within the desired optical output spectrum.

13. The method as claimed in claim 12, further comprising defining a desired optical output frequency of the electro-optical modulator and generating the segments in such a way that the resonance frequency of the electrical resonant circuit of at least one of the segments at least essentially corresponds to the desired optical output frequency.

* * * * *